Jan. 24, 1967          J. R. MASON          3,300,780
              ELECTRONIC SURVEYING SYSTEM
Filed Jan. 19, 1965                    7 Sheets-Sheet 1

INVENTOR.
John R. Mason
BY
Golove & Kleinberg
ATTORNEYS

INVENTOR.
John R. Mason

INVENTOR.
John R. Mason
BY
Golove & Kleinberg
ATTORNEYS

INVENTOR.
John R. Mason
BY
Golove + Kleinberg
ATTORNEYS

3,300,780
ELECTRONIC SURVEYING SYSTEM
John R. Mason, Escondido, Calif., assignor to
Cubic Corporation, San Diego, Calif.
Filed Jan. 19, 1965, Ser. No. 426,620
18 Claims. (Cl. 343—12)

The present invention relates to an electronic surveying system, and more particularly to an electronic system employing phase comparison techniques capable of determining slant range between two stations which may be in motion relative to each other.

An electronic system for measuring slant range between two relatively displaced stationary instruments with a precision compatible with geodetic surveying requirements was disclosed in the patent to Robert V. Werner et al., No. 3,078,460, issued February 19, 1963. Another system to accomplish a similar purpose was described in Patent No. 2,907,999, issued October 6, 1959, to T. L. Wadley.

A basic limitation of both of the systems set forth in the above-identified patents was that any range measurement be the result of a sequential operation using several ranging frequencies, during which time both of the instruments were required to be in a fixed, immobile position. The ultimate range measurement was then derived by an arithmetic manipulation of the measurements at each of several ranging frequencies since each ranging frequency was selected to be unambiguous over a limited distance.

For example, a signal at 10 megacycles per second frequency is unambiguous in a measurement of any distance less than 50 feet, with a resolution of 1 part in 1000. A signal at a frequency of 1.0 megacycle per second is unambiguous in the measurement of distances less than 500 feet, a signal at 100 kilocycles per second measures distances less than one mile (5,280 feet), unambiguously, and a ten kilocycles per second signal unambiguously determines distances under ten miles (52,800 feet). Therefore, a measurement at each of these frequencies, can unambiguously determine the distance between two points that are less than 10 miles apart, to an accuracy of 1 inch or better.

In both of the above described systems, a carrier frequency, substantially higher than the measuring frequencies, is generated at one of the stations, and a different carrier frequency of similar magnitude is generated at the other of the two stations. The ranging frequencies are then modulated onto the carrier for transmission from one station to the other. The measurement at each ranging frequency is a separate operation, and measurements at all of the ranging frequencies are required for the unambiguous determination of a distance between the stations.

In the Wadley device in particular, the ranging signal from the first station is received at the second station and is compared with a virtually identical ranging frequency, generated locally at the second station. The second station transmits its locally generated ranging frequency, modulated on its carrier and a separate modulation signal, representing a precisely predetermined frequency difference between the received ranging signal and the locally generated ranging signal is provided as a pulse modulation on the carrier. At the first station, a new comparison is made, this time between the first ranging signal and the received ranging signal. The phase delay between this difference signal and the received pulse, representing the difference transmitted from the second station, provides a relative measure of distance between stations.

In the Werner, et al. device, two similar, interchangeable units were employed for performing a measuring function, and for each distance measurement one unit is delegated to act, by a front panel switch position, as a master station and the other as a slave. Five separate range readings were taken, in a serial manner, at the master station to derive distance, resolve ambiguities and provide other corrective information. Four of the readings were taken, one at a time, with the master station successively generating and transmitting range signal frequencies of 10.000 mc./s., 9.000 mc./s., 9.900 mc./s., and 9.990 mc./s. which appeared as modulation signals on a carrier signal at a frequency of approximately 9 kmc./s. For each of these readings, the slave station generated a carrier signal exactly 48 megacycles higher than the received master station carrier signal, and, by coupling a portion of the transmitted signal in both master and slave stations back to their respective incoming received signals, an I.F. signal of 58 mc./s. was generated and employed in both units.

The slave station produced a range signal exactly 1.0 kc./s. less than each of the noted master range signals and these slave-produced signals were modulated on the slave carrier signal for transmission back to the master. In addition, the 1.0 kc./s. signal employed in the slave station for creating its 1.0 kc./s. signal difference from the master range signal was also modulated on a separate carrier signal, of 70 kc./s., which was also transmitted to the master unit.

The effect of mixing the two range signals, displaced by 1 kc./s., as modulated on respective frequency displaced carrier signals, in both of the master and slave I.F. amplifiers was to A.M. modulate the I.F. signal at the 1.0 kc./s. signal difference rate. The phase relationship between this A.M. component in the master station I.F. signal with the 1.0 kc./s. signal modulated at the slave on the 70 kc./s. signal, was a function of the distance between master and slave stations. Furthermore, this phase information was based not on the 1.0 kc./s. signal frequency, but on the actual frequency of the range signal, that is, 10.000 mc./s. Hence, by employing this method of handling the range signals, phase shift information inherent in the 10.000 mc./s. signal was transferred to the 1.0 kc./s. signal at the input of the I.F. amplifier, with the result that a narrow-band I.F. amplifier could be employed, and extremely high accuracy information was obtainable.

In the master station, the phase difference between the two 1.0 kc./s. signals, that is, the A.M. modulation component appearing on the I.F. signal and the reference 1.0 kc./s. signal modulated on the 70 kc./s. signal, was measured and recorded as time differences for each of these previously-noted four range signal frequencies. Then, a final reading was taken in which the master station range signal frequency was set again at 10.000 mc./s., and the slave station return range signal frequency was *higher* by 1.0 kc./s., rather than the earlier 1.0 kc./s. lower frequency. The operation of the two stations was similar to the other range signal cases and the phase difference was again recorded.

A final data reduction process, which required manual performance, employed the five readings obtained to determine the actual distance between master and slave stations. In particular, the 10.000 mc./s. range signal reading with the lower or −1.0 kc./s. slave return signal was subtracted from the corresponding reading taken with the higher or +1.0 kc./s. slave signal. The subtraction operation effectively canceled out the phase delay incurred in the 1.0 kc./s. signal modulated on the 70 kc./s. signal in its travel from slave to master and, in addition, canceled out all major slave and master circuitry introduced, phase delays.

In addition, the subtraction performed for the 9.000 mc./s., 9.900 mc./s. and 9.990 mc./s. range signal results derived phase information corresponding to transmitted range signals of 1.000 mc./s., 100 kc./s. and 10 kc./s., respectively, or the difference between each of the range signals and the highly accurate 10.000 mc./s. signal. The resulting values were manipulated to resolve ambiguities to obtain an unambiguous final time delay, based on the actual master-slave distance.

Although the above described systems are useful for geodetic surveying purposes, the requirement that both stations be absolutely stationary during the process of making measurements limits their utility. Humans must operate the equipment and therefore the equipment can only be used in areas accessible to humans which are immovable for extended periods of time. It has been desired to provide a system which can furnish reasonably accurate distance measurements, as between remotely located stations that are capable of unattended operation. Further, it is desirable to provide accurate distance measurements as between two relatively moving stations. One such typical application might be a system that is operable to provide slant range between a fixed, land based station and a station which might be located on a marine vehicle or on a slowly moving or hovering, aircraft.

Further, it is desirable to have an electronic surveying system that automatically sequences as among the several ranging frequencies that are necessary for unambiguous determination of distance to the required accuracy, and which is capable of automatically displaying range at all times, based on continuous measurement of distance between the stations.

According to the present invention, a surveying system is provided which includes many of the advantages of the Werner et al. system in that a receiver band width for the difference frequencies, only, may be used but is not required and in which the measurement information is contained in the phase difference between two signals of related frequency that are simultaneously returned from a second station. It can be shown that one of the signals includes range information and instrumental error, while the other includes instrumental error, only. Phase comparison of these signals after they are converted to the same frequency eliminates the instrumental errors and yields the desired range measurement.

In a preferred embodiment of the present invention a surveying system includes three stations, an Interrogator or master station with a display capability and a pair of Responder or slave stations, Range I and Range II which are remotely located from the master station. The master is then capable of providing slant range information to each of the slave stations and, if the slaves are placed in known locations to provide a common base line, then the location of the master, at all times, can be determined by triangulation methods.

In other common alterntive embodiments, utilizing graphic plotters, the instantaneous location of a moing Interrogator can be plotted on a suitable map, relative to the positions of the remote Responders, once their positions are known accurately.

The two Responder or slave units are substantially identical and differ only in that they transmit on different carrier frequencies so that the Interrogator can distinguish as between them. Further, in the preferred embodiment, ranging frequencies, of substantially 1.5 megacycles per second for Fine range, 150 kilocycles per second for Intermediate range, and 15 kilocycles per second for Coarse range are used to provide accurate range information up to 10 kilometers.

The calibrating frequencies chosen are 2,000 cycles per second and 500 cycles per second. A 2 megacycle per second clock is used to divide each 2,000 cycle per second wave into one thousand parts. Therefore, any difference in phase can be directly related to a delay in time and therefore a simple digital counter driven by the 2 megacycles clock can provide a direct display of range in units of distance.

Each count of the Fine ranging frequency represents .10 meter of range, each count at the Intermediate ranging frequency represents 1.0 meter, and each count at the Coarse ranging frequency represents 10 meters. Internal logic in the counter and display unit permits the Coarse measurement to control the most significant range digits and the Fine measurement to control the least significant digits.

Before viewing in more detail the actual operation of the remaining portion of the circuitry, it is desirable to consider in a general manner certain of the theoretical aspects upon which its operation is based. The physical principle upon which the present electronic distance-measuring system is based is that an electro-magnetic wave, propogated through the atmosphere, the relative phase of the signal at each point in the path of travel is a function of the relation between the wave length of the signal and the distance travelled. For example, a 1.5 megacycle signal will demonstrate one cycle or 360 degrees of phase shift for approximately every 200 meters of travel through the atmosphere.

The physical principle is utilized by the present system in that the carrier signal in the master station is, for a first range measurement, frequency modulated by a 1.5 megacycle signal and the phase delay incurred in its travel between the master and slave stations is effectively measured, although not, as will be later seen, directly. Now, as noted above, a 1.5 megacycle signal experiences a phase delay of one cycle, or 360 degrees, for approximately every 200 meters of travel. The distance information thus obtained will exhibit two major characteristics. In the first place, the distance represented by the measurable phase shift will be accurate down to within .1 meter since, in general, the accuracy to which signal phase shift measurements may be made is a function, approximately one part in several thousand, of the wave-length of the signal being measured. However, secondly, the distance information thus obtained will be ambiguous, that is, the measurement will represent some fraction or portion of 200 meters and the total number of complete cycles made in its travel, which, of course, is needed to obtain the total distance, will not be known.

In order to resolve the ambiguity in this 1.5 megacycle carrier, and thereby enable its accuracy characteristics to be employed by the system in achieving ultimate measurement accuracy, it is necessary to employ carrier signal frequencies of progressively lower frequencies. Each of the successively lower frequency signals serves to resolve the ambiguities of the next higher frequency, with the lowest signal frequency being so chosen that its wave-length is sufficiently long to resolve the maximum distance intended to be employed between the Interrogator and Responder units in meeting the anticipated surveying requirements. In particular three of such signal frequencies are employed by the present system in making distance measurement, these signals being 1.5 mc./s., 150 kc./s., and 15 kc/s., the latter yielding an unambiguous range of approximately 20 km. Since the readings in one direction are made only after the signal has returned to the Interrogator, the unambiguous slant range distance is 10 km.

Although a modulation technique of the type described would appear to be the obvious approach to take, one insurmountable problem would arise, as based on practical electronic considerations. In particular, modulation signals of 1.5 mc./s. and .15 mc./s. would require excessive receiver I.F. bandwidth, and present electronic techniques are incapable of meeting problems connected with noise, low gain, circuit complexity, etc., associated with such requirements. Additionally, other disadvantages would occur, even if the I.F. bandwidth requirements could be electronically met. In the first place, owing to the amount of separation between adjacent frequencies, a separate oscillator circuit would be required for producing each signal. Also, for reasons to be later shown, two separate measurements would have to be taken for each modulation signal in order to compensate for, and hence eliminate, certain fixed phase delays incurred in each modulating signal as it passed through the internal electronic circuitry, first described in the Werner et al Patent No. 3,078,460.

In order to ease the I.F. band width requirements and to eliminate the need for three separate oscillators, the present system employs a single, high frequency oscillator. Suitable frequency dividing circuits are used to derive the lower frequency signals. For example, a 1498.486 kc./s. oscillator is used to generate the "FINE" frequency, a divide-by-10 network produces the 150 kc./s. signals for the INTERMEDIATE frequency and a second, divide-by-10 network is used to produce the 15 kc./s. signal which is utilized as the COARSE frequency. The choice of 1498.486 kc./s. is, of course, based on the velocity of transmission of radio waves through atmosphere, and is chosen to provide exact and precise wave lengths of 20.0 kilometers, 2.0 kilometers and 200.0 meters.

Owing to the input-output coupling present in each duplexer, all of the modulation signals will be applied to the I.F. amplifiers in both stations. Now, a rather unexpected result is obtained from such a mixture, as may be shown by an elaborate mathematical derivation lying considerably outside the scope of the present invention. In particular, it may be shown that if a pair of carrier signals $f_{c1}$ and $f_{c2}$, are frequency modulated by a pair of modulation signals, $f_{m1}$ and $f_{m2}$, respectively, and are mixed in an I.F. amplifier operating at a frequency equal to $f_{c1}-f_{c2}$, and if the bandwidth of the I.F. is significantly narrower than $f_{m1}$ and $f_{m2}$, then the I.F. signal will be amplitude-modulated by a signal equal to $f_{m1}f_{-m2}$, the modulation signal difference. Thus, in the present case, since the Interrogator and Responder carrier signals differ by the I.F. frequency, the A.M. modulation signal appearing on the I.F. signal will be equal to the frequency difference between the range signals. Another result obtained is that the phase information contained in the original 1.5 mc./s. range signal has been effectively transferred to $\omega_R$, calibrating signal. Accordingly, this information is readily handled by the I.F. amplifier without any of the previously noted difficulties associated with a 10 mc./s. I.F. signal.

In particular, the phase difference between the calibrating signals as they appear in the Interrogator station's I.F. signal, includes a component representing the distance travelled between Interrogator and Responder. As will be later shown by an elementary mathematical analysis, the phase difference between these two signals also includes various Interrogator and Responder circuitry phase shifts in addition to the desired distance information. The manner of separating the desired distance from circuit phase information forms an important aspect of the present invention and will be later explained in more detail.

A brief discussion of the system concept with a mathematical justification of the approach pursued in the present invention, will aid in an understanding of the electronic embodiment. As pointed out more fully below, ranging frequencies are selected which undergo phase shifts that are directly related to the distance between an interrogator and a Responder station and which can be expressed as timed intervals.

In the simplest kind of range measuring system, a pulse is generated and transmitted. The time elapsing between the generation of the pulse and the return of the pulse, either by retransmission or reflection, gives a measure of the distance travelled by the pulse based on the speed of propagation of radiation in the medium. A more complex system uses a continuous wave transmission and a frequency is selected so that the length of a wave is approximately equal to the maximum distance to be measured. Other frequencies are then utilized of successively shorter wave lengths to determine the distance with increasingly greater resolution. The difference in phase between a transmitting wave and a received wave would represent the number of "standing waves" in the round trip distance plus some fraction of a wave. Since the integral number of waves cannot be determined at each frequency unambiguously, the difference in phase represents a fractional wave only. However, since the wave length at the lowest frequency is greater than the maximum distance to be measured, the measurements at the other frequencies can resolve the ambiguities representing integral numbers of waves in the shorter wave length.

Assume that a prime ranging frequency, $\omega_1$ is generated in the Interrogator and is modulated upon a carrier signal. The signal represented by $$\cos(\omega_1 t) \qquad (1)$$

is transmitted and, with a phase delay represented by $$\cos(\omega_1 t - \omega_1 \tau) \qquad (2)$$

is present at the Responder station. Assuming that the wave length of the $\omega_1$ signal is greater than the round trip distance between the Interrogator and the Responder, the amount of phase shift is a measure of distance.

The Responder unit includes apparatus for receiving the prime ranging frequency signal $\omega_1$ and the received signal will include a phase lag corresponding to the distance between the Interrogator and Responder which can be expressed as $\omega_1 \tau$. At the Responder a first local calibrating signal is generated at a frequency $\omega_R$ which includes an arbitrary phase component $\psi_R$. A second local calibrating signal is derived from this by dividing the frequency $\omega_R$ by a factor N to produce a frequency $\omega_R/N$ with an arbitrary phase $\psi_R/N$.

A composite ranging signal is then generated at the Responder for transmission to the Interrogator and, more particularly, a pair of composite signals are generated, one having a frequency equal to the sum of the prime ranging frequency $\omega_1$ and the first local calibrating frequency $\omega_R$ and which is designated $\omega_2$. The second composite frequency is the sum of $\omega_2$ and the second calibrating frequency $\omega_R/N$ and this frequency is designated $\omega_3$.

$$\omega_2 = \omega_1 + \omega_R \qquad (3)$$
$$\omega_3 = \omega_1 + \omega_R + \omega_R/N \qquad (4)$$

When transmitted, the composite frequencies $\omega_2$ and $\omega_3$ include arbitrary phase components $\psi_2$ and $\psi_3$, respectively. These can be derived by an examination of the relations between the various frequencies existing at the Responder. If the locally generated signal $\omega_2 t + \psi_2$ has subtracted from it the received prime ranging signal of frequency $(\omega_1 t - \omega_1 \tau)$ $$\cos(\omega_2 t + \psi_2) - \cos(\omega_1 - \omega_1 \tau) = \cos(\omega_R t + \psi_R) \qquad (5)$$

frequency, then the resulting signal will be at frequency $\omega_R$ which will be affected by a Responder equipment delay that can be expressed as $\omega_R \tau_R$. Similarly, if the composite signal $\omega_2 t + \psi_2$ is subtracted from composite signal $(\omega_2 t + \psi_3)$, then the second calibrating frequency $\omega_R/N$ will also be passed through the Responder and will similarly undergo equipment delays $$\frac{\omega_R}{N}\tau_R \cdot \cos(\omega_3 t + \psi_3) - \cos(\omega_2 t + \psi_2) = \cos\left(\frac{\omega_R}{N}t + \frac{\psi_R}{N}\right) \qquad (6)$$

Arbitrary phase $\psi_2$ can then be expressed in terms of the component phases, corresponding to $\psi_R$, the arbitrary phase of the calibrating frequency generated, $\omega_R \tau_R$, the Responder equipment delay, and $\omega_1 \tau$, the phase delay attributed to the one way trip of the prime ranging frequency $\omega_1$. Similarly, the arbitrary phase $\psi_3$ can be expressed in terms of the arbitrary phase $\psi_2$, the arbitrary phase of the second calibrating frequency $\psi_R/N$ and the Responder equipment delay $$\frac{\omega_R}{N}\tau_R.$$

$$\psi_2 = -\omega_1\tau + \omega_R\tau_R + \psi_R \quad (7)$$

$$\psi_3 = \psi_2 + \frac{\omega_R}{N}\tau_R + \frac{\psi_R}{N} \quad (8)$$

The Responder then transmits a carrier upon which signals are modulated which can be represented by the expressions $\cos(\omega_2 t + \psi_2)$ and $\cos(\omega_3 t + \psi_3)$. At the Interrogator, these signals, too, undergo a phase delay due to the transit distance which can be expressed as $\omega_2\tau$ and $\omega_3\tau$, respectively.

At the Interrogator, the prime ranging frequency is subtracted from the composite frequency $\omega_2$, to provide the first calibrating frequency $\omega_R$, $$\cos(\omega_2 t + \psi_2 - \omega_2\tau) - \cos\omega_1 t = \cos(\omega_R t + \psi_2 - \omega_2\tau) \quad (9)$$

which experiences equipment delays in the Interrogator represented by the expression $\omega_R \tau_2$. Similarly, $\omega_2$ is subtracted from $\omega_3$ to produce the second calibrating signal $\omega_R/N$ which undergoes equipment delays in the Interrogator represented by the expression $$\frac{\omega_R}{N}\tau_I.$$

$$\cos(\omega_3 t + \psi_3 - \omega_3\tau) - \cos(\omega_2 t + \psi_2 - \omega_2\tau) = \quad (10)$$

$$\cos\left(\frac{\omega_R}{N}t - \frac{\omega_R}{N}\tau + \frac{\psi_R}{N} + \frac{\omega_R}{N}\tau_R\right) \quad (11)$$

If the phase component attributable to the first calibrating frequency in the Interrogator is examined, it will be seen that the arbitrary phase existing at the Interrogator is made up of components corresponding to the phase delay of the transmitted signal $\omega_R\tau$, the equipment delay in the Responder $\omega_R\tau_I$, the equipment delay in the Interrogator $\omega_R\tau_I$, the arbitrary phase of the calibrating signal $\psi_R$ and a phase delay representing twice the one way phase delay in the prime ranging frequency $2\omega_1\tau$.

$$\text{PHASE } 1 = \omega_R\tau + \omega_R\tau_R + \omega_R\tau_I - \psi_R + 2\omega_1\tau \quad (12)$$

Similarly, a careful examination of the components in the arbitrary phase of the second calibrating frequency $\omega_R/N$ will show that it includes components corresponding to the transit of the signal $$\frac{\omega_R}{N}\tau$$

the equipment delay in the Responder $$\frac{\omega_R}{N}\tau_R$$

the equipment delay in Interrogator $$\frac{\omega_R}{N}\tau_I$$

and the arbitrary phase angle $\psi_R/N$.

$$\text{PHASE } 2 = \frac{\omega_R}{N}\tau + \frac{\omega_R}{N}\tau_R + \frac{\omega_R}{N}\tau_I - \frac{\psi_R}{N} \quad (13)$$

If now the second calibrating frequency is multiplied by N, and subtracted from the first calibrating frequency signal, any phase difference existing between the two signals is wholly attributable to the round trip of the prime ranging frequency, $2\omega_1\tau$, $$\text{PHASE } 1 - N \cdot \text{PHASE } 2 = 2\omega_1\tau \quad (14)$$

In the preferred embodiment of the present invention, the foregoing relationships are incorporated into hardware which will be described in greater detail below.

It is accordingly an object of the present invention to provide an electronic surveying system capable of accurately measuring the separation between two points in motion relative to each other.

Another object of the present invention is to provide a pair of displaced electronic units capable of measuring a phase shift in a range modulation signal transmitted therebetween, and to display such a phase shift as a measure of the distance between the units.

A still further object of the present invention is to provide an electronic phase measuring system in which the phase information, corresponding to distance, in a relatively high frequency modulation signal is effectively transferred to a relatively low frequency calibrating signal whereby high accuracy distance information is obtained with only normal I.F. band width requirements.

Still another object of the present invention is to provide a pair of electronic units capable of measuring distance between two points to unambiguously high accuracy requirements, by measurement and display of phase delay between each of a series of different wave length signals transmitted and received between the units.

A further object of the present invention is to provide a pair of portable, automatic electronic surveying units capable of determining distance to high accuracy by measuring phase shift incurred in signals simultaneously transmitted from one to the other of the units.

Another object of the present invention is to provide a pair of displaced electronic units in radio signal communication with each other, operable to selectively transmit and receive a series of range modulation signals whereby unambiguous distance information between the units is obtained and displayed in one of the units by determining phase shift between received signals in each of the series of range signals, automatically.

A further object of the present invention is to provide a pair of spaced electronic units capable of measuring distance between them by selectively modulating the carrier signal produced by one of the units with a series of range signals of increasingly longer wave lengths, and receiving the carrier signal at the other unit and re-transmitting a carrier signal modulated with a pair of range signals, each differing in frequency by a predetermined amount from the received range signals, whereby phase difference between the pair of signals received at the first unit includes a component representing distance between the units.

Yet another object of the present invention is to provide a pair of spaced electronic units capable of measuring the distance between them by producing a first carrier signal at a first carrier frequency at the first unit modulating the first carrier signal unit with a first range signal having a first range frequency, transmitting the modulated first carrier signal to the second unit wherein the second unit transmits a pair of range signals at a respective pair of range frequencies on a second carrier signal having a second carrier signal frequency, whereby the retransmitted signal received at the first unit is mixed with the transmitted signal, and the resulting I.F. signal contains a pair of amplitude modulation signals whose frequency corresponds to the difference between the first range signal and each one of the second pair of range signal frequencies, the pair of amplitude modulation signals including phase information corresponding to the distance between the two points.

It is still a further object of the present invention to provide an electronic distance measuring system, the units of which may be in motion relative to each other which automatically sequences through a series of distance measurements at different frequencies, each having a different unambiguous range resolution and which automatically displays at one of the units an unambiguous reading of the distance of the other units.

It is yet another object of the present invention to provide an electronic distance measuring system including an Interrogator unit in radio communication with a pair of Responder units, for measuring and displaying at the Interrogator, the distance to each of the Responders by automatically transmitting a series of ranging signals successively modulated upon the Interrogator carrier signal, each of the Responders receiving and demodulating the transmitted signal and each transmitting a corresponding series of pairs of ranging signals, the frequencies in each pair differing by a predetermined amount modulated upon a distinctive carrier frequency, whereby the received Responder signals are mixed in the Interrogator to provide pairs of ranging signals each pair including a phase delay representing the distance between the Interrogator and the respective Responder.

It is still another object of the present invention to provide an electronic distance measuring system including an Interrogator unit and a pair of Responder units, each transmitting a distinctive carrier signal at a different frequency, each movable relative to the others and all operating in combination to display at the Interrogator digital representation of the distance between the Interrogator and each of the Responders, as determined by the phase difference existing between a pair of signals transmitted from each of the Responders and received by the Interrogator.

It is a further object of the invention to provide an electronic position locating system including a movable Interrogator unit whose position is to be determined and a pair of stationary Responder units whose location is known, by continuously measuring and displaying the distance between the Interrogator and each of the Responders.

It is yet an additional object of the invention to measure the distance between a spatially separated Interrogator unit and a Responder unit by generating a ranging frequency signal $\omega_1$ at the Interrogator and transmitting the ranging signal on a first carrier to the Responder wherein a pair of integrally related calibrating signals at frequencies $\omega_R$ and $\omega_R/N$ are generated and combined with the received ranging frequency to produce a pair of composite ranging frequency signals $\omega_2$ and $\omega_3$ which are retransmitted to the Interrogator on a second carrier, the Interrogator being operable to extract the pair of calibrating signals from the received signal, modify the frequency of one of the calibrating signals to equal the other and quantize the phase difference between them, the quantized phase difference representing the distance between Interrogator and Responder.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

Figure 1:
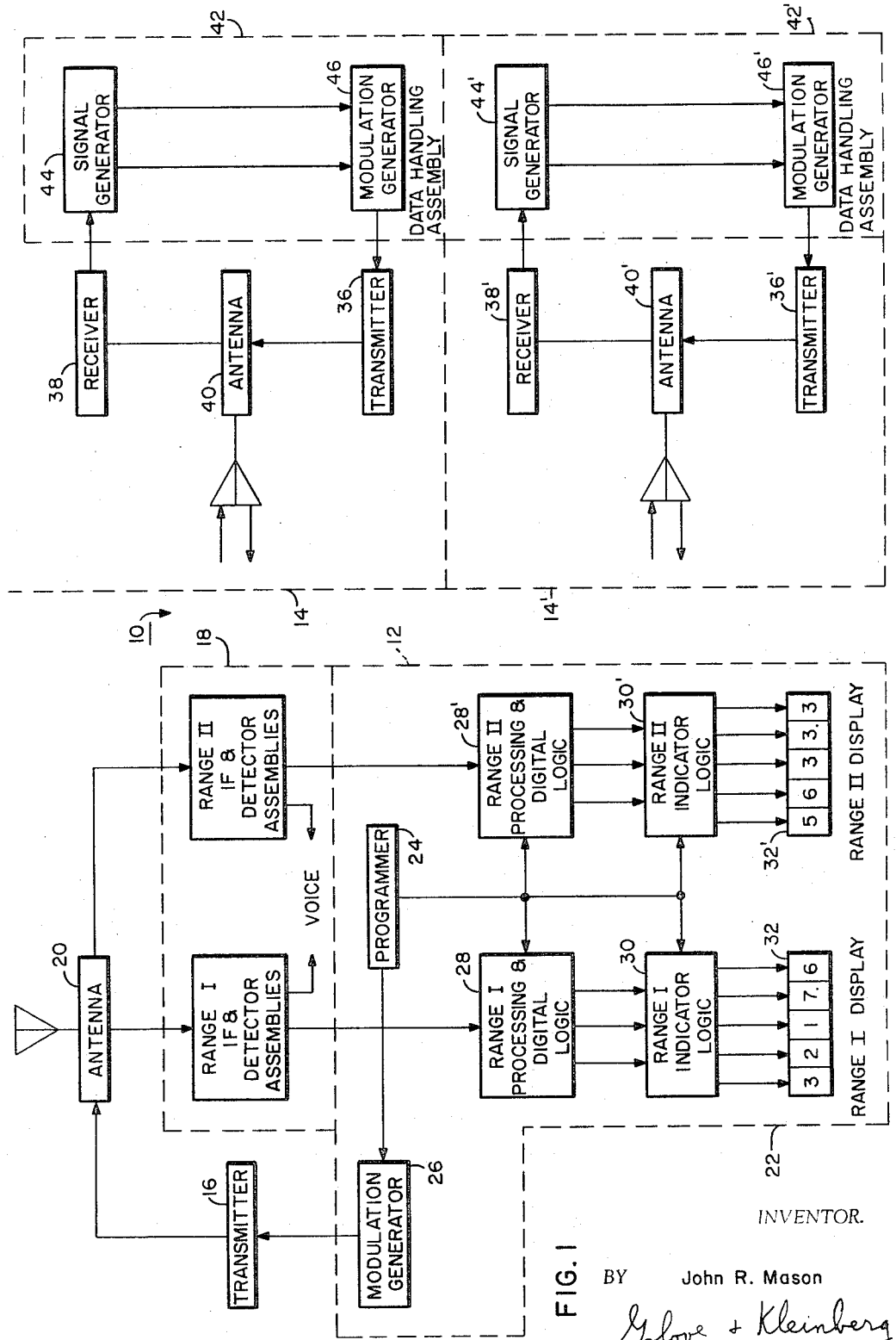
FIG. 1 is a simplified block diagram of a surveying system according to the present invention.

Turning first to FIG. 1, there is shown in simplified block diagram, a surveying system 10 which includes an Interrogator unit 12 and, in the preferred embodiment, a pair of Responder units 14, 14' each operating at a slightly different frequency. However, the principles of operation and basic configuration of the two Responders 14, 14' is substantially identical except for their transmitting frequencies.

The Interrogator 12 broadly comprises a transmitter assembly 16, a receiver assembly 18 and an antenna assembly 20 for transmitting and receiving radio energy signals. A data handling assembly 22 is provided which receives inputs from the receiver assembly 18 and provides an output to the transmitter assembly 16.

Within the data handling assembly, to be explained more fully below, there is a programmer unit 24 which is connected to a modulation generator 26 for selectively enabling one of several ranging frequencies to be applied to the transmitter assembly 16. In the preferred embodiment, three such ranging frequencies are generated and are alternatively applied to the transmitter assembly 16. The programmer 24 also controls and selectively enables a data processing digital logic assembly 28 associated with Responder I (designated RANGE I) and a similar data processing and digital logic assembly 28' associated with Responder II (RANGE II). The output of the data processing and digital logic unit 28 is applied to an indicator logic assembly 30 which in turn controls a Range I display 32. Similarly, an indicator logic assembly 30' and a Range II display 32' are associated with the Range II data processing and digital logic assembly 30'.

Considering the Responders 14, and 14', only the first or RANGE I Responder 14 will be described, it being understood that the second or RANGE II Responder 14' is substantially identical therewith. The RANGE I Responder 14 includes a transmitter assembly 36, a receiver assembly 38 and an antenna assembly 40 which are connected through a Responder data handling assembly 42. Within the data handling assembly 42 are a Responder signal generator 44 which is connected to a modulation generator 46. The signal generator is connected to receive the output of the receiver assembly 38. The modulation generator 46 is connected to apply output signals to the transmitter assembly 36. A more detailed description of the Interrogator and Responder units 12, 14 will be presented in greater detail below, as well as a description of their operation.

Figure 2:
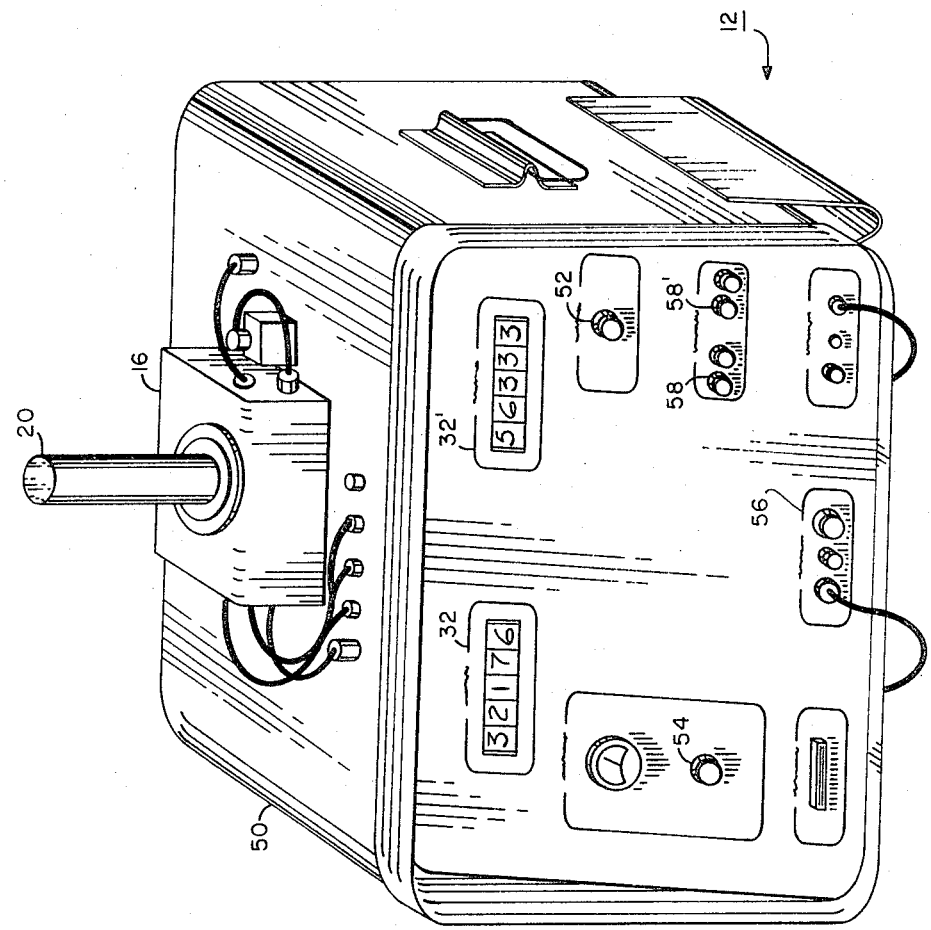
FIG. 2 is a front view of a preferred embodiment of an Interrogator unit according to the present invention.

FIG. 2 is a front view of a preferred embodiment of an Interrogator 12 according to the present invention and the front panel and the controls thereof are clearly shown. A heavy protective case 50 is provided to enable transport of the Interrogator unit and a cover (not shown) is provided for transporting and shipping purposes. An omnidirectional antenna assembly 20 is attached to the case together with an RF transmitter 16 which generates the necessary radiating frequencies.

Looking at the front panel, particularly, the range displays 32, 32' are shown as illuminated numbers provided by glow tubes whose electrodes are shaped in numerical configuration and are generally available under the trademark "NIXIE" tubes. A rotatable switch 52 enables the selection of one of many operating modes and a second rotatable switch 54 is provided to select circuits for monitoring. A jack and controls 56 are provided to connect a headset and microphone for voice communication and the Interrogator can alternatively transmit measuring frequencies or voice frequencies. A pair of calibrating adjustments 58, 58' is provided, and each is associated with one of the Responders for adjustment of the calibrating frequencies.

Figure 3:
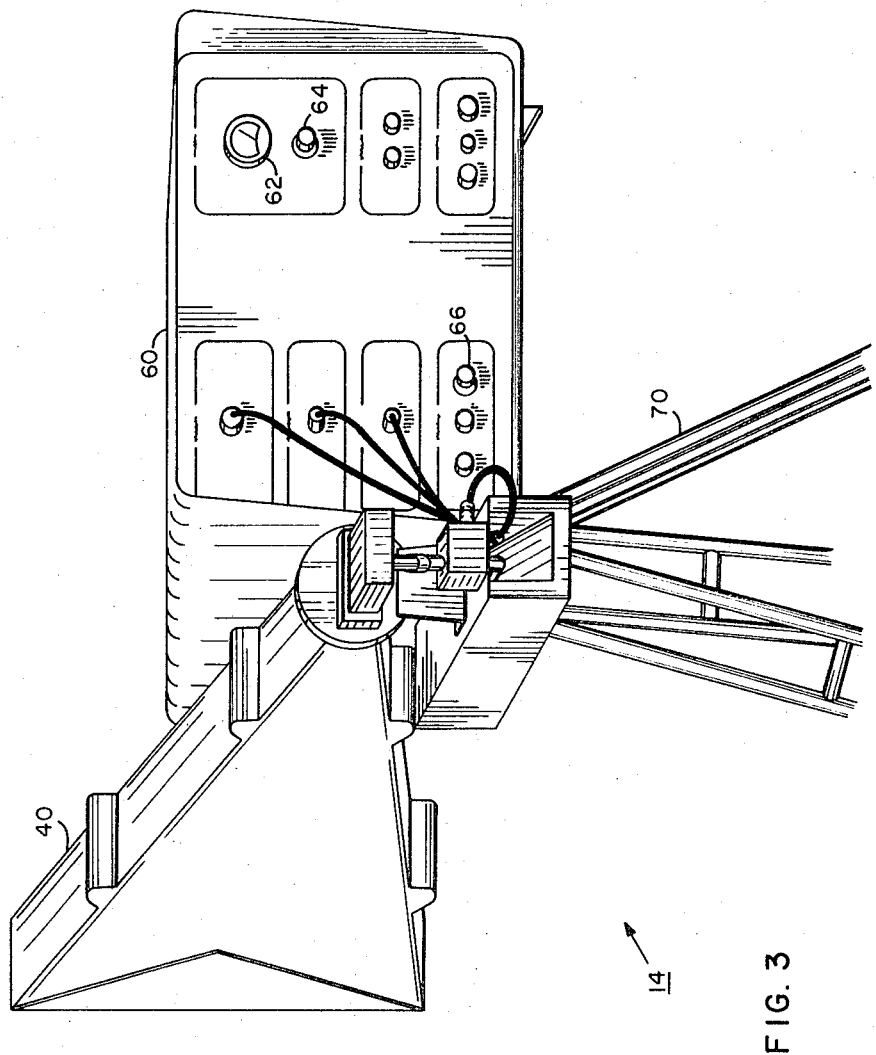
FIG. 3 is a front view of a preferred embodiment of a Responder unit according to the present invention.

In FIG. 3, an embodiment of a Responder unit 14 is shown which includes a carrying case 60, directional antenna assembly 40 in conjunction with associated monitoring panel 62, adjusting panels for the calibrating frequencies and a voice link communication control switch 66.

The entire assembly can be mounted on a tripod 70 and is adapted for substantially unattended operation. A fuller explanation of the circuits involved and the manner of operation will be presented in conjunction with the description of the figures below.

Figure 4:
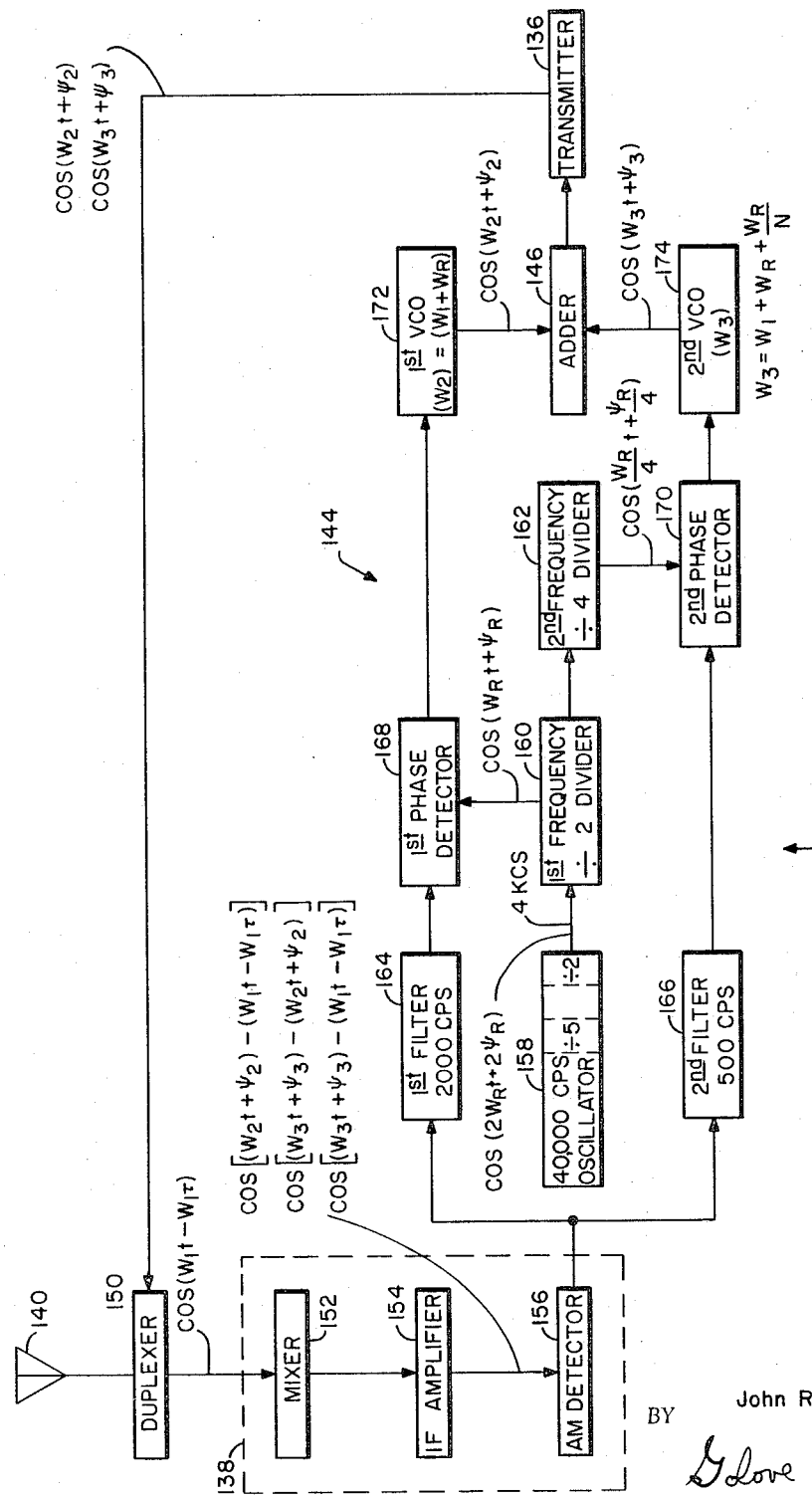
FIG. 4 is a simplified block diagram of a typical Responder unit according to a preferred embodiment of the present invention.
Figure 5:
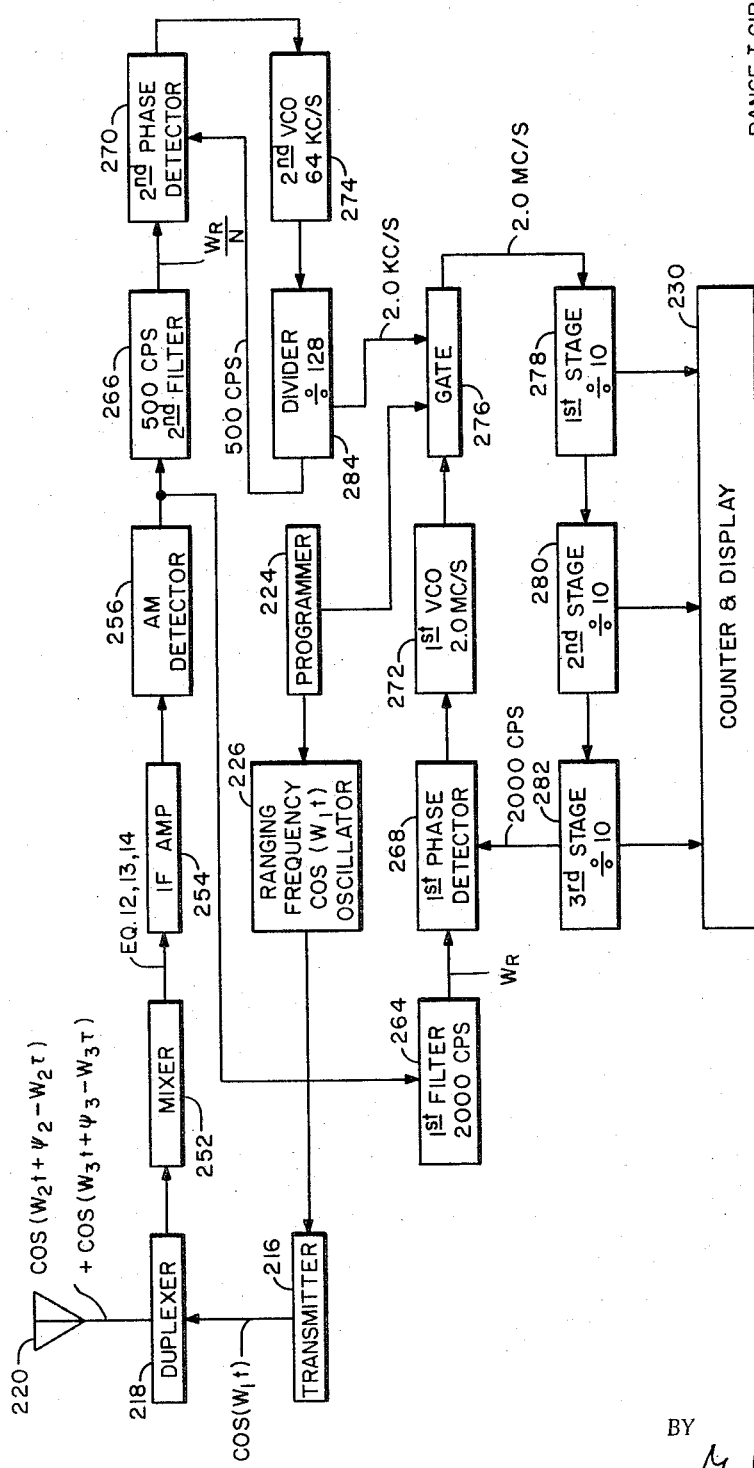
FIG. 5 is a simplified block diagram of an Interrogator unit according to the present invention.

In FIGS. 4 and 5, block diagrams are set forth of the main elements of the Responder and Interrogator units, illustrating a preferred mechanization of the equations set forth above. It will be understood that both the Interrogator and the Responders include carrier frequency generating circuits to provide the carrier frequency upon which the ranging frequencies are superimposed for transmission as between the Interrogator and Responders.

Turning first to FIG. 4, there is shown the "data portion" of a Responder unit 114. It may be assumed, for the purpose of this discussion, that the Responder 114 is equivalent to the Range I Responder 14, which is substantially similar, in all details, to the Range II Responder 14' (not shown in detail). Further, the elements of FIG. 4 can be generally corresponded to the elements of FIG. 1.

The input to the system of FIG. 4 is detected by the antenna 140 which is connected to a duplexer 150. The duplexer 150 transmits the received signals to a mixer 152, whose output signal in turn, is applied serially through an I.F. amplifier 154 into an A.M. detector 156.

The signal received by the duplexer 150 includes, as a component modulated upon the carrier signal, a ranging signal that can be represented by the expression $$\cos (\omega_1 t - \omega_1 \tau) \quad (15)$$

in which the portion of the parenthetic expression $-\omega_1\tau$ represents the phase delay of the ranging frequency $\omega_1$ as a result of the transmission from the Interrogator to the output of the duplexer circuit 150. At the same time, the duplexer 150 receives the output of the transmitter 136 which includes signals at frequencies represented by expressions $\cos (\omega_2 t + \psi_2)$ and $\cos (\omega_3 t + \psi_3)$. These signals are applied through the duplexer 150 to the antenna 140 for transmission to the Interrogator unit, but a portion of this signal is also applied through the duplexer 150 to the mixer 152.

Within the signal generator block 144, a 40 kc./s. oscillator 158 includes suitable frequency divider circuits to generate a frequency of 4,000 cycles per second which, in the preferred embodiment is expressed as $\cos (2\omega_R t + 2\psi_R)$ and is therefore twice the first calibrating frequency. The signal output of the oscillator 158 is applied to a first frequency divider circuit 160 which divides the frequency in half, thereby producing a 2,000 c.p.s. signal, represented by $$\cos (\omega_R t + \psi_R) \quad (16)$$

The output of the first frequency divider 160 is applied to a second frequency divider 162 which performs a division by 4, resulting in an output frequency of 500 c.p.s. which is, in the preferred embodiment, the frequency whose mathematical representation is $$\cos \left( \frac{\omega_R}{N} t + \frac{\psi_R}{N} \right) \quad (17)$$

Assuming that the response of the I.F. amplifier 154 does not extend to the frequency of $\omega_1$, $\omega_2$ or $\omega_3$, the output of the I.F. amplifier 154 includes, as an A.M. modulation on the I.F. signal, the differences as between the received frequency and the frequencies transmitted by the Responder. Therefore, the I.F. amplifier 154 output includes A.M. components resulting from the mixing of signals in the mixer 152 and the difference signals produced include:

$$\cos [(\omega_2 t + \psi_2) - (\omega_1 t - \omega_1 \tau)] \quad (18)$$
$$\cos [(\omega_3 t + \psi_3) - (\omega_2 t + \psi_2)] \quad (19)$$
$$\cos [(\omega_3 t + \psi_3) - (\omega_1 t - \omega_1 \tau)] \quad (20)$$

The A.M. detector 156 applies these signals simultaneously to a first filter 164 which is responsive to a 2,000 cycle per second frequency, or $\omega_R$, and to a second filter 166 that is responsive to signals at a frequency of 500 cycles per second or $\omega_R/N$. The output of the first filter 164 is applied to one input of a first phase detector 168 and the output of the second filter circuit 166 is applied to the input of a second phase detector 170. The second input to the first phase detector 168 is provided by the first frequency divider 160 and the second input to the second phase detector 170 is provided by the output of the second frequency divider 162.

The output of the first phase detector 168 is applied to control a first VCO 172 or voltage controlled oscillator, whose frequency output is defined as $\omega_2$ and represents the sum of the frequencies $\omega_1$ and $\omega_R$. The effect of the phase detector 168 controlling the first VCO 172 is to keep the output signal of the VCO 172 in phase with the $\omega_R$ component of the signal from the duplexer 150. Therefore, the output of the first VCO 172 can be represented by $\cos (\omega_2 t + \psi_2)$.

Similarly, the output of the second phase detector 170 is applied to control a second VCO 174 or voltage controlled oscillator which generates an output frequency of $\omega_3$ in phase with the $\omega_R/N$ component of the signal at the duplexer. The output of the second VCO 174 can be represented by $\cos (\omega_3 t + \psi_3)$.

The output signals of both the first and second VCO's 172, 174 are applied to an adding network 146, the output of which is applied to the transmitter 136, thereby providing the signals at frequencies $\cos (\omega_2 t - \psi_2)$ and $$\cos (\omega_3 t + \psi_3)$$

referred to above.

Turning now to FIG. 5, the comparable Range I circuits of an Interrogator 212 are set forth. A ranging frequency oscillator 226, in a preferred embodiment, generates one of three, prime ranging frequencies under control of a programmer 224. The ranging frequency oscillator generates frequencies for measuring FINE, INTERMEDIATE and COARSE range, sequentially, but the data circuits for each of these ranging frequencies is substantially the same. The ranging frequency is referred to as $\cos (\omega_1 t)$ generally throughout the following discussion.

The output of the ranging frequency oscillator 226 is applied to the transmitter 216, the output of which is applied to a duplexer 218. The duplexer 218 output is applied to the transmitting and receiving antenna 220. The RF circuits which generate the carrier and modulate the ranging frequency signal upon the carrier are not shown herein in FIGS. 4 and 5, but are within the skill of the art. The output of the duplexer 218 and the transmitted carrier signal of the antenna 220 includes a modulation component at a frequency $\cos (\omega_1 t)$.

The Interrogator unit 212 receives, at the antenna 220, the carrier signals transmitted from each of the Responders. Each is respectively applied to the proper Range portion. Here the Range I signal is applied to a mixer 252, the output of which is applied serially through an I.F. amplifier 254 and an A.M. detector 256. The output of the A.M. detector 256 is supplied both to a first filter 264 that is responsive to signals at 2,000 c.p.s. or $\omega_R$ and to a second filter 266, that is responsive to 500 c.p.s. or $\omega_R/N$.

The output of the first filter 264 is applied to a first phase detector 268 and the output of the second filter is applied to a second phase detector 270. The first phase detector 268 controls a first VCO 272 or voltage control oscillator that operates at a basic frequency of 2.0 mc./s. which in this embodiment is $1000\omega_R$. The second phase detector 270 applies its output to control a second VCO 274 that operates at a frequency of 64 kc./s. which in this embodiment is $128\omega_R/N$.

The output of the first VCO 272 is applied to one input of a display gate circuit 276 that is controlled by the output of the programmer 224. The output of the gate circuit 276 is the 2.0 mc./s. signal which is then applied to a three-stage frequency dividing circuit. A first divide by 10 frequency divider stage 278, is serially connected to a second divide-by-10 frequency divider stage 280, and then to a third divide-by-10 frequency divider stage 282. The output of the third stage 282 is applied as a second input to the first phase detector 268 and is at a frequency of 2,000 c.p.s. or $\omega_R$.

The second, controlling input to the display gate 276 comes from a divide-by-128 frequency divider 284 that is connected to receive the output of the second VCO 274. The input to the display gate 276 is derived from an intermediate stage of the divider 284 to provide a signal at 2.0 kc./s. which is equal to $N \cdot \omega_R/N$. The output of the divider 284 provides a second input to the second phase detector 270.

The display gate 276 passes the 2.0 mc./s. signal when enabled by the presence of an enabling signal from the programmer 224. Upon removal of the signal from the programmer 224, when the 2,000 cycle signal crosses zero, the display gate 276 is disabled thereby terminating the application of 2.0 mc./s. signals to the three divide-by-10 divider stages 278, 280, 282.

The output of the first divide-by-10 stage 278 is applied to the least significant bit portion of a counter and display unit 230 to provide the least significant data bit and the second and third stages 280, 282, provide the next significant bits, respectively, of the five decimal digit output display number during the FINE range operation. During the INTERMEDIATE and COARSE modes, the next most and most significant digits, respectively, are derived from the third stage 282. This logic within the counter and display unit 230 corrects for ambiguity and compensates for possible errors in signals so that the range measurement, as displayed, is correct.

In operation, it will be recognized that the mixer 252 will provide, as an A.M. modulation in the Intermediate Frequency or I.F., the differences of the received Responder signals and the transmitted Interrogator signal which, when processed in the A.M. detector 256, provides in the preferred embodiment, the 2,000 c.p.s. or $\omega_R$ component, and a 500 c.p.s. or $\omega_R/N$ component.

As pointed out below, the $\omega_R$ signal and the $\omega_R/N$ signals each include phase delays introduced by equipment, but only one, the $\omega_R$ signal, also includes the phase delay representing the transit time from Interrogator to Responder and back to the Interrogator. Therefore, multiplication of $\omega_R/N$ component by N, in this case, 4 and subtraction, herein mechanized by controlling the gate 276 with the 2,000 c.p.s. output of the divide-by-128 divider 284, permits the first VCO 272, operating at 2.0 megacycles per second, to generate a number of impulses at half-microsecond intervals which represent the transit time phase delay. These impulses are accumulated and the total accumulated count, represents, in tenths of meters, the spatial distance between the Interrogator and the Responder corresponding to ½ the round trip delay.

Referring to FIGS. 4 and 5, the mathematical justification of the approach is based on the Interrogator 212 generating and transmitting a prime ranging frequency $\omega_1$ which is received at the Responder 114 with a phase lag component representing the remainder, after dividing the distance by the wave length of a wave at frequency $\omega_1$.

At the Responder 114, two calibrating signals are generated, a first at a frequency $\omega_R$, and a second, at a frequency $\omega_R/N$ where N is an integer. The first calibrating frequency can be expressed by $\cos(\omega_R t + \psi_R)$ where $\psi_R$ represents an arbitrary phase and a second calibrating signal, which is expressed as $$\cos\left(\frac{\omega_R}{N}t + \frac{\psi_R}{N}\right)$$

Responder circuits generate a pair of composite modulating signals at frequencies $\omega_2$ and $\omega_3$ which can be expressed as:

$$\cos(\omega_2 t + \psi_2) \quad (21)$$

$$\cos(\omega_3 t + \psi_3) \quad (22)$$

where $\psi_2$ and $\psi_3$ are arbitrary phases attributed to each of these frequencies respectively. The composite modulating frequencies are correlated to be in phase with the received ranging frequency.

The relationship of the various transmitted frequencies is as follows:

$$\omega_2 = \omega_1 + \omega_R \quad (23)$$

$$\omega_3 = \omega_2 + \omega_R/N \quad (24)$$

The Responder modulation frequencies are included in recirculating loops which tend to keep all frequencies in phase with a common calibrating oscillator. The two modulating frequencies $\omega_2$ and $\omega_3$ are additively combined and applied to the transmitter circuit.

At the mixer 152 of the Responder, the following difference signals are then produced:

$$\cos[(\omega_2 t + \psi_2) - (\omega_1 t - \omega_1 \tau)] \quad (25)$$

$$\cos[(\omega_3 t + \psi_3) - (\omega_2 t + \psi_2)] \quad (26)$$

$$\cos[(\omega_3 t + \psi_3) - (\omega_1 t - \omega_1 \tau)] \quad (27)$$

Of primary interest are the first two, difference signals of Equations 25 and 26 which correspond to Equations 18 and 19, above. If the phase components are equal, the two signals passing through the I.F. amplifier 154 will be at the frequencies $\omega_R$ and $\omega_R/N$. If phase linearity of these circuits over this range is maintained, the phase delays attributable to the I.F. circuits in the Responder will be $\omega_R \tau_R$ and $$\frac{\omega_R}{N}\tau_R$$

respectively.

The circuits are arranged in a closed loop fashion and the loop equation for $\omega_2$, when the inputs to the first phase detector 168 are equal is:

$$\cos[(\omega_2 t + \psi_2) - (\omega_1 t - \omega_1 \tau) - \omega_R \tau_R] = \cos(\omega_R t + \psi_R) \quad (28)$$

$$\text{(a)} \quad \text{(b)} \quad \text{(c)} \quad \text{(d)}$$

where (28) (a) represents the output of the first VCO 172 as one signal into the mixer 152, (b) represents the received ranging signal into the mixer 152, (28) (c) is the phase delay in the I.F. circuits and (28) (d) represents the output of the first frequency divider 160.

Substituting the values of $\omega_2$, $$\cos(\omega_2 t + \psi_2) = \cos[(\omega_1 + \omega_R)t - \omega_1 \tau + \omega_R \tau_R + \psi_R] \quad (29)$$

$$\psi_2 = [-\omega_1 \tau + \omega_R \tau_R + \psi_R] \quad (30)$$

Similarly, the loop equation for $\omega_3$ is:

$$\cos\left[(\omega_3 t + \psi_3) - (\omega_2 t + \psi_2) - \frac{\omega_R}{N}\tau_R\right] = \cos\left[\frac{\omega_R}{N}t + \frac{\psi_R}{N}\right] \quad (31)$$

$$\cos[\omega_3 t + \psi_3)] = \cos\left[\left(\omega_2 + \frac{\omega_R}{N}\right)t + \psi_2 + \frac{\omega_R}{N}\tau_R + \frac{\psi_R}{N}\right] \quad (32)$$

$$\psi_3 = \left[\psi_2 + \frac{\omega_R}{N}\tau_R + \frac{\psi_R}{N}\right] \quad (33)$$

These signals each undergo a phase shift in the transmission back to the Interrogator. At the Interrogator 212 input therefore, the signals received are:

$$\cos(\omega_2 t + \psi_2 - \omega_2 \tau) = \cos[(\omega_1 + \omega_R)t - (2\omega_1 + \omega_R)\tau + \omega_R \tau_R + \psi_R] \quad (34)$$

and $$\cos(\omega_3 t + \psi_3 - \omega_3 \tau) = \cos\left[\left(\omega_2 + \frac{\omega_R}{N}\right)t - \left(\omega_2 + \frac{\omega_R}{N}\right) + \psi_2 + \frac{\omega_R}{N}\tau_R + \frac{\psi_R}{N}\right] \quad (35)$$

Again difference signals are produced at the input mixer 252 of the Interrogator providing:

$$\cos[\omega_2 t + \psi_2 - \omega_2\tau - \omega_1 t] = \cos[\omega_R t - (2\omega_1 + \omega_R)\tau + \omega_R\tau_R + \psi_R] \quad (36)$$

$$\cos[(\omega_3 - \omega_2)t + \psi_3 - \omega_3\tau + \omega_2\tau - \psi_2] = \cos\left[\frac{\omega_R}{N}t - \frac{\omega_R}{N}\tau + \frac{\omega_R}{N}\tau_R + \frac{\psi_R}{N}\right] \quad (37)$$

$$\cos[(\omega_3 - \omega_1)t + \psi_3 - \omega_3\tau] = \cos\left[\left(\omega_R + \frac{\omega_R}{N}\right)t - \left(2\omega_1 + \omega_R + \frac{\omega_R}{N}\right)\tau + \left(\omega_R + \frac{\omega_R}{N}\right)\tau_R + \left(\psi_R + \frac{\psi_R}{N}\right)\right] \quad (38)$$

If again phase linearity in the Interrogator I.F. amplifier 254 over the frequency $\omega_R/N$ to $\omega_R$ is maintained, and phase delays attributable to the I.F. circuits are $$\frac{\omega_R}{N}\tau_I \text{ and } \omega_R\tau_I$$

the A.M. detector 256 output obtained can be expressed:

$$\cos[(\omega_R t - (2\omega_1 + \omega_R)\tau + \omega_R\tau_R - \omega_R\tau_I + \psi_R] \quad (39)$$

$$+\cos\left[\frac{\omega_R}{N}t - \frac{\omega_R}{N}\tau + \frac{\omega_R}{N}\tau_R - \frac{\omega_R}{N}\tau_I + \frac{\psi_R}{N}\right] = \quad (40)$$

$$\cos\left[\left(\omega_R + \frac{\omega_R}{N}\right)t - \left(2\omega_1 + \omega_R - \frac{\omega_R}{N}\right)\tau + \left(\omega_R + \frac{\omega_R}{N}\right)\tau_R - \left(\omega_R + \frac{\omega_R}{N}\right)\tau_I + \psi_R + \frac{\psi_R}{N}\right] \quad (41)$$

The two signals of primary interest are (39) and (40). These are the received calibrating frequency signals with accumulated phase delays. If the signal (40), corresponding to $\omega_R/N$ is multiplied by N and subtracted from signal (39), the phase information $-2\omega_1\tau$ is obtained representing the phase shift attributable to the round trip of the ranging frequency signal $\omega_1$ and all other phase components are subtracted out.

The indication subtraction can, in the preferred embodiment be mechanized by separating the signals represented by Equations 39 and 40 from the receiver detector through band pass filters 264, 266 at their respective frequencies $\omega_R$ and $\omega_R/N$. A local oscillator provides the proper signals corresponding to the $\omega_R$ and $\omega_R/N$ frequencies. At the output of the input mixer the signals include 500 and 2,000 c.p.s. components respectively, corresponding to the transmitted $\omega_R/N$ and $\omega_R$ signals which are used to determine the phase of the locally generated $\omega_R$ and $\omega_R/N$ signals.

The second VCO 274 and frequency divider 284 provides a 2,000 c.p.s. signal that is equal to $\omega_R/N \cdot N$. The 2,000 c.p.s. signal is processed in a servo loop that includes three stages of division by 10 of a 2 megacycle clock. A display counter is connected to the output of each of the dividers and the input to the divider is stopped at the zero crossing of the 2,000 c.p.s. signal from the divider 284. The number stored in the display counter representing the phase difference between the $\omega_R$ and $N(\omega_R/N)$ signals is available for direct reading in terms of range.

The programmer 224 alternatively controls the transmission of the various ranging frequencies and includes circuitry for correcting and updating the display once each second.

In a preferred embodiment of the electronic surveying system of the present invention, a basic ranging frequency oscillator clock was utilized having a frequency of 1,498,486 kilocycles per second and produces a wave of exactly 200 meters in length. This frequency represented the FINE ranging frequency. A divide-by-ten divider circuit provides an INTERMEDIATE ranging frequency. When divided down, still further, by a second divide-by-10 dividing circuit, a COARSE frequency is provided, which are alternatively selected by the Programming unit. The frequencies are chosen to provide an exact metric distance representation at the display as a function of phase shift in the selected ranging frequencies.

Figure 6:
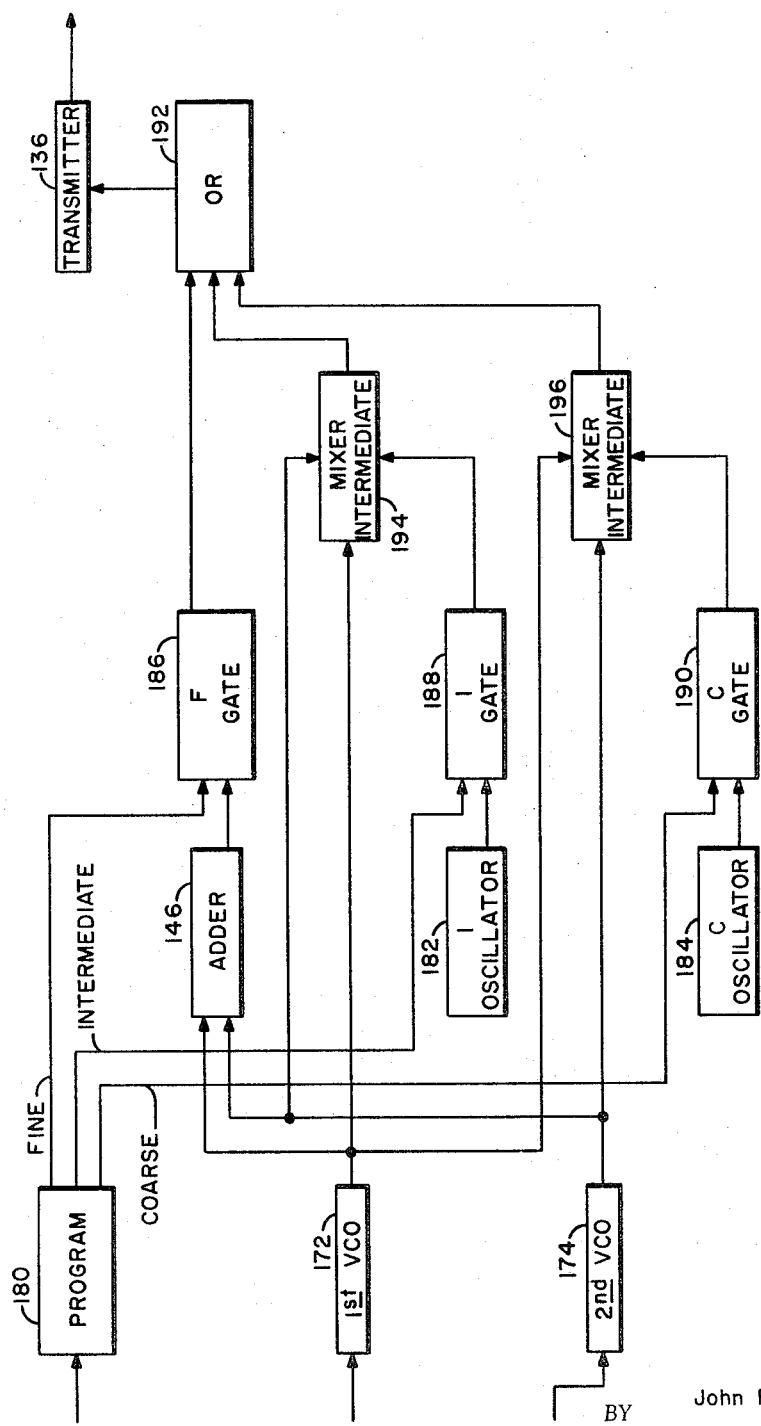
FIG. 6 is a block diagram of a signal combining circuit suitable for use as a modulation generator in the Responder of FIG. 1.

It will be understood that to derive the Intermediate and Coarse frequencies, additional oscillators would be added to the system of FIG. 4, including a pair of oscillators, one operating at frequencies equivalent to the FINE ranging frequency minus the INTERMEDIATE frequency and the other operating at the frequency equivalent to the FINE ranging frequency minus the COARSE frequency. FIG. 6 is a block diagram of a preferred embodiment of the modulation generator assembly 46 of FIG. 1 and which, under control of a programmer unit in the responder, would selectably enable one of the three frequency ranges.

Turning to FIG. 6, there is shown a suitable arrangement to provide the proper response from the Responder. Shown with the reference numerals of the prior figures are the first and second VCO's 172, 174, the adding circuit 146 and the transmitter 136. A programming unit 180 operates in response to signals from the $\omega_R$ loop and permits a cycling among the various enabling signals until a signal is provided from the $\omega_R$ loop indicating that the proper frequency range has been so enabled, at which time the programming unit 180 ceases cycling. When the Interrogator switches ranging frequencies, it is clear that the $\omega_R$ loop will be unstable and, after a predetermined interval of time, the program unit 180 will commence cycling until the proper frequency range is selected.

An INTERMEDIATE range oscillator 182 and a COARSE range oscillator 184 are provided to generate signals at frequencies equal to the difference between the FINE ranging frequency and the INTERMEDIATE frequency and between the FINE frequency and the COARSE frequency. A set of three gates, a FINE gate 186, an INTERMEDIATE gate 188 and a COARSE gate 190 are each, selectively enabled by the FINE, INTERMEDIATE and COARSE outputs, respectively, of the program unit 180.

The output of the first FINE gate 186 is applied to one input of an adder 192 which may be considered equivalent to an OR circuit, the output of which is applied to the transmitter 136. When the Fine gate is enabled, the sum of the frequencies generated by the first and second VCO's 172, 174 is applied to the transmitter 136.

The second, Intermediate gate 188 receives an input from the Intermediate oscillator 182 and applies its output to an Intermediate mixer 194. The mixer receives the first and second VCO output and produces the difference of the frequencies of the Intermediate oscillator and the two VCO's which is applied to the adder 192.

The third, Coarse gate 190 is driven by the Coarse oscillator 184 and its output is applied to a Coarse mixer 196 which generates the difference of the applied frequencies and applies the difference to the adder 192.

In operation, therefore, the program unit 180 selectively enables only one of the Fine, Intermediate or Coarse gates 186, 188, 190 which in turn permit only one input to the adder 192 which in turn is applied to the transmitter 136 for radiation to the Interrogator unit.

Figure 7:
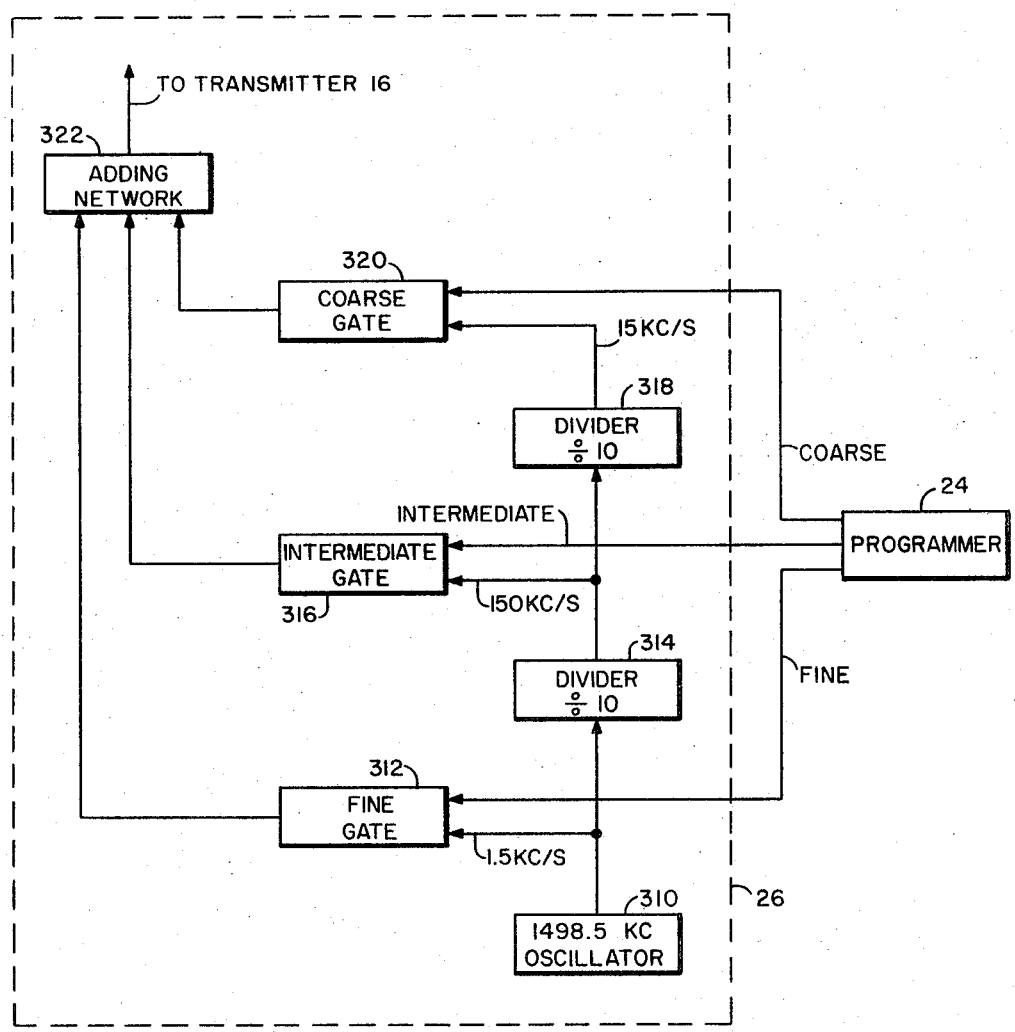
FIG. 7 is a block diagram of a signal combining circuit suitable for use as a modulation generator in the Interrogator of FIG. 1.

Turning now to FIG. 7, there is shown, in detail, a modulation generator 26, suitable for use in the Interrogator circuits of FIG. 1. It is noted that the modulation generator 26 of FIG. 7 is the Interrogator counterpart of the Responder modulation generator, which is shown in detail in FIG. 6 above.

The programmer 24 provides three enabling signals, respectively designated COARSE, INTERMEDIATE, and FINE, which select one of three ranging frequencies generally designated $\omega_1$. The ranging frequencies are originally derived from an oscillator 310 which is tuned to generate a frequency of 1498.5 kc./s. At this frequency, a standing wave in atmosphere has a length of exactly twenty kilometers. For convenience, however, the frequency will be considered to be 1.5 mc./s. The signal is applied to one of the inputs of a FINE gate 312, which is enabled at a second input by the FINE enabling signal from the programmer 24.

The output of the oscillator 310 is also applied to a first frequency divider network 314 which divides by 10 and, at an output, provides the INTERMEDIATE ranging frequency of 150 kc./s. The output of this first divider 314 is applied to one of the inputs of an INTERMEDIATE gate 316, the other input of which is connected to receive the INTERMEDIATE enabling signal from the programmer 24. The output of the first divider 314 is also applied to a second divider 318 which again divides by 10 to produce a 15 kc./s. or COARSE ranging frequency output. The output of the second divider 318 is applied to one of the inputs of a COARSE gate 320, the other input of which is adapted to receive the COARSE enabling signal from the programmer 24.

The signal outputs of the FINE gate 312, the INTERMEDIATE gate 316 and the COARSE gate 320 are applied to an adding network 322 whose output is applied to the transmitter 16 of FIG. 1. Since only one of three programmer outputs, COARSE, INTERMEDIATE or FINE is enabled at any time, the adding network 322 could also be considered as an "OR" gate, and the output of adding network 322 is the output of the modulation generator 26.

Thus, there has been shown a new and improved electronic distance measuring system which utilizes a relatively long wave calibrating signal and a second calibrating signal whose wave length is integrally related to the first calibrating signal to determine distance and measuring the relative phase displacement of the two calibrating signals when brought to a common frequency. It has been shown that one of a pair of integrally related calibrating signals includes a phase component attributable to both equipment delays and the phase delay undergone by the round trip of a ranging signal while the other of the calibrating signals includes only those phase components attributable to equipment delays. Therefore, a comparison of the calibrating signals converted to a common frequency, provides a phase measurement which directly represents the phase delay attributable to the round trip of the ranging signal.

Further, a plurality of ranging signals are used, of successively longer wave lengths, in which the longest wave length is greater than the distance to be measured. The shortest wave length is selected so that it can be conveniently divided into increments, one of which represents the ultimate accuracy of the system. Means are provided for selectively transmitting the various ranging signals in a predetermined sequence, automatically, so that in any given interval, a measurement at each of the frequencies can be made.

Also set forth is an improved readout and display system which quantizes the phase difference using a high speed clock operating at a frequency that corresponds to the accuracy with which an increment of phase difference is to be resolved. For example, in the preferred embodiment herein, a calibrating frequency of 2,000 cycles per second was used to control a 2 megacycle clock, the pulses of which, when applied to a counter result in a measurement of phase difference to one part in a thousand. If the wave length of the highest frequency ranging signal corresponds to 200 meters (representing a round trip between the Interrogator and Responder), then a display with an accuracy of 1/10 meter is feasible.

In the preferred embodiment of the system, a pair of Responders are shown in conjunction with a single Interrogator so that in addition to distance measurements to unattended remote but known locations with a relatively movable Interrogator, it is also possible, given a known base line between two Responders, to locate, at all times, the position of a moving Interrogator.

Other equipment and modifications will be apparent to those skilled in the art, and it is to be understood that the scope of the invention is to be limited only by the scope of the claims as appended hereto.

What is claimed as new is:

1. In an electronic distance measuring system for determining and signalling the spatial separation between a pair of spaced sources of radiation, the combination including:
   a pair of spaced sources of carrier signals of predetermined frequencies including source 1 and source 2, the carrier signals from said source 1 being frequency modulated by a ranging signal of a first frequency less than the carrier signal frequencies, the carrier signals from said source 2 being frequency modulated by a pair of composite signals, one of said pair of composite signals having a frequency equal to the sum of the frequencies of said ranging signal and a first calibrating signal, the other of said pair of composite signals having a frequency equal to the sum of said one of said pair of composite signals, and a second calibrating signal;
   means at said source 2 for receiving the carrier signal modulated by said ranging signal and for maintaining phase synchronism between the received ranging signal and the ranging signal portion of said pair of composite signals;
   receiving means at said source for receiving the other said carrier signal, demodulating said composite signals and for deriving therefrom said first and second calibrating signals; and
   distance display means at said source 1 connected to said receiving means, for converting said first and second calibrating signals to a common frequency, quantizing any phase difference existing therebetween, and for displaying said quantized phase difference as a measure of spatial separation as between source 1 and source 2.

2. In an electronic surveying system for measuring the slant range between a first station at a first location, spatially separated from a second station at a second location, the first station including means for generating and transmitting a first carrier signal, and means adapted to receive a second carrier signal, the second station including means for generating and transmitting a second carrier signal, and means adapted to receive the first carrier signal, the combination comprising:
   first means at the first station for generating a first ranging signal at a frequency $\omega_1$ and for modulating said first ranging signal upon the first carrier signal for transmission therewith;
   second means at the second station for generating first and second calibrating signals at frequencies, $\omega_2$ and $\omega_R/N$, related by the whole integer N;
   third means connected to said second means and adapted to receive and extract the transmitted first ranging signal for generating first and second composite signals at frequencies $\omega_2$ and $\omega_3$, respectively, where $\omega_2 = \omega_1 + \omega_R$ and $\omega_3 = \omega_2 + \omega_R/N$ in predetermined phase synchronism with the received first ranging signal;
   fourth means connected to said third means for modulating said first and second composite signals on the second carrier signal for transmission to the first station;
   fifth means at the first station coupled to said first means for receiving said first and second composite signals and for extracting therefrom said first and second calibrating signals;
   sixth means connected to said fifth means for converting said first and second calibrating signals to a common frequency and for quantizing the phase difference existing therebetween; and seventh means connected to said sixth means and responsive to said quantized phase difference to display a number corresponding to the spatial separation between the stations.

3. Apparatus as in claim 2 in which the wave length of said first ranging signal is less than the spatial separation between the first and second locations and said first calibrating signal frequency is less than one-fourth said first ranging signal frequency.

4. Apparatus as in claim 2 in which said first ranging signal frequency $\omega_1$ is substantially equal to 15 kcs.; said first calibrating signal frequency is substantially equal to 2,000 c.p.s. and $N=4$.

5. Apparatus as in claim 2 wherein said first means further include means for generating a second ranging signal of frequency $\omega_1'$, where $\omega_1'=100\omega_1$ and means for selectively modulating said first and second ranging signals on the first carrier signal, alternatively; said third means further include means for generating third and fourth composite signals at frequencies $\omega_2'$ and $\omega_3'$, respectively, where $\omega_3'=\omega_1'+\omega_R$ and $\omega_3'=\omega_2'+\omega_R/N$, in predetermined phase synchronism with the received second ranging signal; said fourth means further includes means responsive to the frequency of the received ranging signal for selectively modulating said first and second composite signals in response to received first ranging signals and for modulating said third and fourth composite signals in response to received second ranging signals; and said seventh means further include means responsive to the frequency of said ranging signal then being modulated on the first carrier signal for scaling said quantized phase difference to represent range to the proper accuracy, whereby the most significant range display digits are controlled by phase difference associated with transmission of said first ranging signal and the least significant range display digits are controlled by phase difference associated with transmission of said second ranging signal.

6. Apparatus as in claim 2 wherein first means further include means for generating second and third ranging signals of frequencies $\omega_1'$ and $\omega_1''$, respectively, where $\omega_1<\omega_1'<\omega_1$ and means for alternatively modulating said first, second and third ranging signals on the first carrier signal for predetermined time intervals in a selected sequence;

said third means further include means for generating third, fourth, fifth and sixth composite signals at frequencies $\omega_2'$, $\omega_3'$, $\omega_2''$ and $\omega_3''$, respectively, where $$\omega_2'=\omega_1'+\omega_R$$
$$\omega_3'=\omega_2'+\omega_R/N$$
$$\omega_2''=\omega_1''+\omega_R$$

and $$\omega_3''=\omega_2''+\omega_R/N$$

in predetermined phase synchronism with the received said ranging signal;
said fourth means further include means responsive to the frequency of the received said ranging signal for selectively modulating the second carrier signal with the appropriate pair of composite signals including the ranging signal component corresponding thereto; and
said seventh means further include means responsive to the frequency of said ranging signal then being modulated on the first carrier signal for scaling said quantized phase difference by a corresponding factor to represent unambiguous range to a desired accuracy, whereby, most significant range display digits are controlled by phase difference associated with said first ranging signal, least significant range display digits are controlled by phase difference associated with said third ranging signal and range display digits of intermediate significance are controlled by phase difference associated with said second ranging signal.

7. In an electronic surveying system including a first station at a first location, and a second station at a second location, means for measuring and displaying the slant range between the first and second stations comprising:

at the first station,
first means adapted to receive a transmitted first carrier signal modulated by a first ranging signal at a frequency $\omega_1$, said received signal including a phase component representing a fractional portion of the ranging frequency signal wave length;
second means for generating a first calibrating signal at a frequency $\omega_R$ and an integrally related second calibrating signal at a frequency $\omega_R/N$;
third means connected to said first and second means for generating, in a predetermined phase relationship with said received ranging frequency signal, first and second composite signals at frequencies $\omega_2$ and $\omega_3$, where $\omega_2=\omega_1+\omega_R$ and $\omega_3=\omega_2+\omega_R/N$;
fourth means connected to said third means for generating a second carrier signal, modulating said first and second composite signals on said second carrier signal, and for transmitting said modulated second carrier signal;

at the second station,
fifth means for generating and transmitting a first carrier signal modulated by a first ranging signal at a frequency $\omega_1$;
sixth means connected to said fifth means for receiving and demodulating said modulated second carrier signal and for recovering said first and second calibrating signals from said received composite signals;
seventh means connected to said sixth means for converting the frequency of said second calibrating signal to the frequency of said first calibrating signal and for deriving and quantizing the phase difference as between said first calibrating signal and said converted second calibrating signal; and
eighth means connected to said seventh means and operable in response to said quantized phase difference for displaying, in a visual numerical form, the slant range between the first and second stations expressed as a fractional part of the wave created by a signal at the prime ranging frequency $\omega_1$.

8. Apparatus of claim 7 further including means at the second station for generating a second ranging signal at a higher frequency $\omega_1'$, where $\omega_1'>\omega_1$, alternatively, and said eighth means include means for expressing range at the combination of quantized phase differences corresponding to measurements at said first and second ranging frequencies;

means coupled to said third means at the first station for generating composite third and fourth signals at frequencies $\omega_2'$ and $\omega_3'$, where $\omega_2'=\omega_1'+\omega_R$ and $\omega_3'=\omega_2'+\omega_R/N$; and
means at the first station coupled to said third means, operable in response to received first and second ranging signals for selecting composite signals respectively corresponding thereto, for application to said fourth means.

9. Apparatus of claim 8, further including: means at the second station for generating a third ranging signal at a higher frequency $\omega_1''$, where $\omega_1''>\omega_1'>\omega_1$;
means for alternatively selecting ranging signals at frequencies $\omega_1$, $\omega_1'$ and $\omega_1''$ for transmission to the first station in predetermined sequence;
means coupled to said third means at the first station generating fifth and sixth composite signals at frequencies $\omega_2''$ and $\omega_3''$, where $\omega_2''=\omega_1''+\omega_R$ and $\omega_3''=\omega_2''+\omega_R/N$; and
means at the first station coupled to said third means and responsive to received first, second and third ranging signals for selectively applying to said fourth means, the respectively corresponding pair of composite signals, for subsequent transmission to the second station.

10. An electronic distance measuring system for measuring and displaying the spatial separation between a first and second station, each having transmitting and receiving means the combination comprising:

at a first station,
means for generating a first carrier signal;
means for generating a first ranging signal;
means for modulating said first ranging signal on said first carrier signal; and transmitting said modulated first carrier;

at a second station,
means adapted to receive said first carrier and for deriving said first ranging signal therefrom;
means for generating a second carrier signal;
means for generating a first calibrating signal;
means for generating a second calibrating signal at a frequency integrally related by a function $1/N$ to the frequency of said first calibrating signal;
means for combining said receiving first ranging signal with said first and second calibrating signals to produce first and second composite signals, respectively, in predetermining phase synchronism with said calibrating signals and said received first ranging signal;
means for modulating said first and second composite signals on said second signal carrier and for transmitting said modulated second signal carrier;
means at the first station for receiving and demodulating said modulated second carrier signal and to derive said first and second composite signals therefrom;
means for deriving from said first and second composite signals said first and second calibrating signals;
means for extracting the phase difference between said first and second calibrating signals;
means for extracting the phase difference between said first and said second calibrating signals at a common frequency; and
means for providing a numerical representation of said phase difference,
whereby the phase shift undergone by said first ranging signal in traversing the distance between the first and second stations is included in the phase difference between said first and second calibrating signals, when at the same frequency.

11. An electronic distance measuring system for deriving and displaying distance between first and second points, said system comprising:
Interrogator means including first transmitting means movably located at the first point for producing and transmitting a first carrier signal at a first carrier frequency and for producing and modulating upon said first carrier signal a first range signal having a first ranging frequency;
Responder means movably located at the second point, said Responder means including first receiving means for receiving said first carrier signal and for demodulating said first range signal therefrom, said received first range signal having a phase component representative of the distance between the first and second points, second transmitting means for generating a second carrier signal at a second carrier frequency and for generating and modulating on said second carrier signal, first and second composite signals in predetermined phase synchronism with said received first range signal, and said first composite signal having a frequency equal to the sum of the frequencies of said received range signal and a first calibrating signal, said second composite signal having a frequency equal to the sum of the frequencies of said first composite signal and a second calibrating signal;
said Interrogator means further including second receiving means connected to said first transmitting means for receiving and demodulating said second carrier signal to recover said first and second composite signals therefrom, mixing means connected to said first transmitting means and second receiving means and responsive to signals therefrom for extracting said first and second calibrating signals, and display and readout means coupled to said mixing means for converting said calibrating signals to a common frequency, quantizing the phase difference existing therebetween, said applying the quantized phase difference to a readout device to provide a continuous visual representation of the distance then separating the first and second locations.

12. Apparatus according to claim 11 wherein said Interrogator means further include primary programming means coupled to said first transmitting means for selectively producing and modulating on said first carrier signal a second and third range signal having a second and third ranging frequency, respectively, in addition to said first range signal, in a predetermined sequence, and said display and readout means further include scaling means for applying quantized phase differences corresponding to said first, second and third range signals to represent most intermediate and least significant portions of the displayed range, respectively; and wherein said Responder means further include secondary programming means responsive to received ranging signals for selectively producing and modulating on said second carrier signal, third, fourth, fifth and sixth composite signals in addition to said first and second composite signals, each in predetermined phase synchronism with its associated received range signal, said third and fifth composite signals being respectively derived from said first calibrating signal and said second and third range signal and said fourth and sixth signals being derived from said second calibrating signal and said third and fifth signals, respectively.

13. In an automatic electronic distance measuring system including an Interrogator unit at a first location and a Responder unit at a second location, each having signal transmitting and receiving means, the combination for measuring and displaying a representation of the spatial separation between the locations comprising:
ranging signal generating means in the Interrogator for producing a first ranging signal having a frequency $\omega_1$, the wave length of which is greater than the separation between the locations, and applying said first ranging signal to the Interrogator signal transmitting means;
calibrating signal generating means in the Responder for producing first and second calibrating signals having frequencies of $\omega_R$ and $\omega_R/N$, respectively, $\omega_R$ being less than $\omega_1$ and N being an integer;
composite signal generating means in the Responder coupled to the receiving means, the transmitting means, and the calibrating signal generating means for generating, in a predetermined phase relationship, first and second composite signals having frequencies $\omega_2$ and $\omega_3$, respectively, where $\omega_2=\omega_1+\omega_R$ and $\omega_3=\omega_2+\omega_R/N$ for transmission to the Interrogator;
signal extracting means in the Interrogator coupled to the signal receiving means and said ranging signal generating means for extracting from the received first and second composite signals said first and second calibrating signals;
quantizing means coupled to said extracting means for converting said received first and second calibrating signals to a common frequency and for quantizing any phase difference existing therebetween; and
display means coupled to said quantizing means for providing a visual output representing the spatial separation between Interrogator and Responder, whereby spatial separation betwen Interrogator and Responder locations causes a transmission phase shift in the ranging signal, which phase shift is transferred at the Responder to the composite signals for retransmission to the Interrogator, and wherein only one of the received calibrating signals includes the transmission phase shift, so that phase comparison of the received calibrating signals, converted to a common frequency, uniquely produces the phase shift of the ranging signal.

14. The apparatus of claim 13 wherein said ranging signal generating means further includes means for producing a second ranging signal having a frequency $\omega_1'$ where $\omega_1' > \omega_1$ and for selectively applying said first and second ranging signals to the Interrogator transmitting means in a predetermined sequence, and means coupling said ranging signal generating means and said display means for applying quantized phase differences associated with said first ranging signal to the more significant portion of said visual display and for applying quantized phase differences associated with said second ranging signal to the less significant portion of said visual display;

and wherein said composite signal generating means include means responsive to received ranging signals for selectively generating, in addition to said first and second composite signals, third and fourth composite signals, having frequencies $\omega_2'$ and $\omega_3'$ respectively, where $\omega_2' = \omega_1' + \omega_R$ and $\omega_3' = \omega_2' + \omega_R/N$ and programming means responsive to received first and second ranging signals for selectively transmitting first and second, and third and fourth composite signals, respectively.

15. In an electronic distance measuring system, including an Interrogator unit at a first location and a Responder unit at a second, relatively remote location, for measuring and displaying an indication of the spatial separation between the first location and the second location, an Interrogator unit comprising:

ranging signal generating means for generating a first ranging signal of a frequency $\omega_1$ having a wave length greater than the spatial separation between the locations;
a second ranging signal of frequency $\omega_1'$ that is greater than $\omega_1$ and a third ranging signal having a frequency of $\omega_1''$ that is greater than $\omega_1'$;
transmitting means adapted to receive applied ranging signals for radiating said ranging signals to remote locations;
programming means connecting said ranging signal generating means and said transmitting means for selectively applying each of said ranging signals to said transmitting means in a predetermined sequence;
receiving means adapted to receive signals transmitted from a Responder at a remote location;
signal selecting means coupled to said receiving means and said ranging signal generating means and operable in response to signals applied therefrom to extract first and second calibrating signals having frequencies $\omega_R$ and $\omega_R/N$, respectively, included in signals applied to said receiving means; and
phase measuring means connected to said signal extracting means for converting received first and second calibrating signals to a common frequency measuring any phase difference between the converted signals, and for quantizing and displaying the phase difference so measured;
whereby distance between the Interrogator and the remote Responder is represented as a unique phase component in only one of the calibrating signals transmitted from the remote Responder and received by said Interrogator.

16. In an electronic distance measuring system including an Interrogator unit at a first location and a Responder unit at a second, relatively remote location, for measuring and displaying an indication of the spatial separation between the first location and the second location, a Responder unit comprising:

receiving means adapted to receive applied first, second and third ranging signals from the Interrogator unit at the distant location, the received first, second and third ranging signals being at respective frequencies $\omega_1$, $\omega_1'$ and $\omega_1''$ alternatively;
calibrating signal generating means for generating first and second calibrating signals at frequencies $\omega_R$ and $\omega_R/N$, respectively, where $\omega_R$ is less than $\omega_1$;
composite signal generating means coupled to said receiving means and said calibrating signal generating means for generating first, second and third pairs of composite signals, alternatively, respectively corresponding to an in predetermined phase relationship with the received first, second and third ranging signals, said first pair of composite signals having frequencies $\omega_2$ and $\omega_3$ where $\omega_2 = \omega_1 + \omega_R$, and $\omega_3 = \omega_2 + \omega_R/N$ said second pair of composite signals having frequencies $\omega_2'$ and $\omega_3'$ where $\omega_2' = \omega_1' + \omega_R$, and $\omega_3' = \omega_2' + \omega_R/N$, and said third pair of composite signals having frequencies $\omega_2''$ and $\omega_3''$, where $\omega_2'' = \omega_1'' + \omega_R$, and $\omega_3'' = \omega_2'' + \omega_R/N$;
transmitting means coupled to said composite signal generating means for radiating applied pairs of composite signals to the Interrogator unit; and
programming means coupled to said receiving means, said calibrating signal generating means and said composite signal generating means, said programming means being operable in response to the frequency of the received ranging signal for selectively enabling the generation of the composite signal pair corresponding thereto, for application to said transmitting means.

17. An electronic distance measuring system having a first transmitter-receiver at a first station and a second transmitter-receiver at a relatively remote second station comprising in combination:

at the first station, first means for generating a first ranging signal having a frequency $\omega_1$;
third means coupled to first and second means for modulating said first ranging signal on said first carrier signal;
fourth means coupled to said third means for transmitting said modulated first carrier signal;
at the second station, fifth means for receiving and demodulating said transmitted modulated first carrier signal;
sixth means for generating a first calibrating signal having a frequency $\omega_R$,
seventh means coupled to said sixth means for generating a second calibrating signal having a frequency $\omega_R/N$;
eighth means coupled to said fifth and sixth means for generating a first composite signal having a frequency $\omega_2$, where $\omega_2 = \omega_1 + \omega_R$;
ninth means coupled to said fifth, sixth and seventh means for generating a second composite signal having a frequency $\omega_3$, where $(\omega_3 = \omega_1 + \omega_R + \omega_R/N)$;
tenth means for generating a second carrier signal;
eleventh means coupled to said eight, ninth and tenth means for modulating said first and second composite signals on said second carrier signal;
twelfth means coupled to said eleventh means for transmitting the modulated second carrier signal;
the first station further including thirteenth means for receiving and demodulating said modulated second carrier signal;
fourteenth means coupled to said thirteenth and second means for mixing the signals therefrom to derive said first and second calibrating signals;
fifteenth means for multiplying said second calibrating signal by a factor N and for comparing the received first calibrating signal with the multiplied second calibrating signal to derive and quantize the phase difference as between said first calibrating signal and said multiplied second calibrating signal; and
sixteenth means coupled to said fifteenth means for digitizing and displaying said quantized phase difference to represent the slant range between the first and second stations.

18. The apparatus of claim 17 further including:
seventeenth means coupled to said third means for generating a second ranging signal having a frequency $\omega_1'$ greater than $\omega_1$;
eighteenth means coupled to said third means for alternatively modulating said first and second ranging signals on said first carrier signal in a predetermined sequence;
ninteenth means coupled to said fifth and sixth means for generating a third composite signal having a frequency $\omega_2'$, where $\omega_2' = \omega_1' + \omega_R$;
twentieth means coupled to said fifth, sixth and seventh means for generating a fourth composite signal having a frequency $\omega_3'$, where $\omega_3' = \omega_1' + \omega_R + \omega_R/N$;
twenty-first means coupling said nineteenth and twentieth means with said eleventh means for alternatively modulating said first and second composite signals and said third and fourth composite signals on said second carrier signal, in response to first and second ranging signals received by said fifth means, respectively; and
twenty-second means connected to said eighteenth and sixteenth means and operable in response to the frequency of the signal being modulated upon said first carrier for scaling the quantized phase difference whereby the most significant range digits are developed during transmission of said first ranging signal and the last significant range digits are developed during transmission of said second ranging signal.

No references cited.

RODNEY D. BENNETT, *Acting Primary Examiner.*

CHESTER L. JUSTUS, *Examiner.*

J. P. MORRIS, *Assistant Examiner.*